United States Patent
Iter et al.

(10) Patent No.: US 11,263,400 B2
(45) Date of Patent: Mar. 1, 2022

(54) IDENTIFYING ENTITY ATTRIBUTE RELATIONS

(71) Applicant: Google LLC, Mountain View, CA (US)

(72) Inventors: Dan Iter, Mountain View, CA (US); Xiao Yu, Mountain View, CA (US); Fangtao Li, San Jose, CA (US)

(73) Assignee: Google LLC, Mountain View, CA (US)

(*) Notice: Subject to any disclaimer, the term of this patent is extended or adjusted under 35 U.S.C. 154(b) by 222 days.

(21) Appl. No.: 16/504,068

(22) Filed: Jul. 5, 2019

(65) Prior Publication Data

US 2021/0004438 A1     Jan. 7, 2021

(51) Int. Cl.
*G06F 40/295*      (2020.01)

(52) U.S. Cl.
CPC .................. *G06F 40/295* (2020.01)

(58) Field of Classification Search
None
See application file for complete search history.

(56) References Cited

U.S. PATENT DOCUMENTS

| | | | | |
|---|---|---|---|---|
| 9,110,852 | B1* | 8/2015 | Lerman | G06F 40/211 |
| 9,864,795 | B1* | 1/2018 | Halevy | G06F 16/285 |
| 10,803,050 | B1* | 10/2020 | Salkola | G10L 15/187 |
| 10,803,248 | B1* | 10/2020 | Arfa | G06F 40/295 |
| 2014/0337358 | A1* | 11/2014 | Mitra | G06F 16/248 |
| | | | | 707/748 |
| 2016/0328383 | A1 | 11/2016 | Cross et al. | |
| 2018/0121827 | A1 | 5/2018 | Green | |

(Continued)

FOREIGN PATENT DOCUMENTS

| | | |
|---|---|---|
| CN | 108073711 | 5/2018 |
| WO | WO 2018/072501 | 4/2018 |

OTHER PUBLICATIONS

Shwartz, Vered, Yoav Goldberg, and Ido Dagan. "Improving hypernymy detection with an integrated path-based and distributional method." arXiv preprint arXiv:1603.06076 (2016). (Year: 2016).*

(Continued)

*Primary Examiner* — Frank D Mills
(74) *Attorney, Agent, or Firm* — Brake Hughes Bellermann LLP (57) ABSTRACT

Methods, systems, and apparatus, including computer programs encoded on a computer storage medium, that facilitate identifying entity-attribute relationships in text corpora. Methods include determining whether an attribute in a candidate entity-attribute pair is an actual attribute of the entity in the entity-attribute candidate pair. This includes generating embeddings for words in the set of sentences that include the entity and the attribute and generating, using known entity-attribute pairs. This also includes generating an attribute distributional embedding for the entity based on other attributes associated with the entity from the known entity-attribute pairs, and generating an attribute distributional embedding for the attribute based on known attributes associated with known entities of the attribute in the known entity-attribute pairs. Based on these embeddings, a feed-forward network determines whether the attribute in the entity-attribute candidate pair is an actual attribute of the entity in the entity-attribute candidate pair.

24 Claims, 3 Drawing Sheets

(56) References Cited

U.S. PATENT DOCUMENTS

| | | | |
|---|---|---|---|
| 2019/0122145 A1 | 4/2019 | Sun et al. | |
| 2019/0286978 A1* | 9/2019 | Aggarwal | G06N 3/0445 |
| 2020/0311110 A1* | 10/2020 | Walker | G06F 16/9024 |
| 2020/0394511 A1* | 12/2020 | Kasai | G06N 3/08 |

OTHER PUBLICATIONS

Cai, Desheng, and Gongqing Wu. "Content-aware attributed entity embedding for synonymous named entity discovery." Neurocomputing 329 (2019): 237-247. (Year: 2019).*

Auer et al., "DBpedia: A Nucleus for a Web of Open Data," The semantic web, Nov. 2007, 14 pages.

Bollacker et al., "Freebase: a collaboratively created graph database for structuring human knowledge," In Proceedings of the 2008 ACM SIGMOD international conference on Management of data, Jun. 2008, 3 pages.

Carlson et al., "Toward an architecture for never-ending language learning," In Twenty-Fourth AAAI Conference on Artificial Intelligence, Jul. 2010, 8 pages.

Dong et al., "Knowledge vault: a web-scale approach to probabilistic knowledge fusion," In Proceedings of the 20th ACM SIGKDD international conference on Knowledge discovery and data mining, Aug. 2014, 10 pages.

Fader et al., "Identifying relations for open information extraction," Proceedings of the conference on empirical methods in natural language processing, Jul. 2011, 11 pages.

Fundel, et al., "RelEx—Relation extraction using dependency parse trees," Bioinformatics, Feb. 2007, 7 pages.

Gupta et al., "Biperpedia: An ontology for search applications," Proceedings of the VLBD Endowment, 12 pages.

Hailon et al., "Attributed and predictive entity embedding for fine-grained entity typing in knowledge bases," Proceedings of the 27th International Conference on Computational Linguistics, Aug. 2018, 11 pages.

Hu et al., "Entity hierarchy embedding," Proceedings of the 53rd Annual Meeting of the Association for Computational Linguistics and the 7th International Joint Conference on Natural Language Processing, Jul. 2015, 9 pages.

Lee et al., "Attribute extraction and scoring: A probabilistic approach," IEEE 29th International Conference on Data Engineering, Apr. 2013, 12 pages.

Mintz et al., "Distant supervision for relation extraction without labeled data," Proceedings of the Joint Conference of the 47th Annual Meeting of the ACL and the 4th International Joint Conference on Natural Language Processing of the AFNLP, 9 pages.

Pasca et al., "The role of documents vs. queries in extracting class attributes from text," Proceedings of the sixteenth ACM conference on Conference on information and knowledge management, Nov. 2007, 9 pages.

Pennington et al., "Glove: Global vectors for word representation," Proceedings of the 2014 conference on empirical methods innatmal language processing (EMNLP), Oct. 2014, 12 pages.

Ren et al., "CoType: Joint Extraction of Typed Entities and Relations with Knowledge Bases," Proceedings of the 26th International Conference on World Wide Web, Apr. 2017, 10 pages.

Shwartz et al., "Improving hypernymy detection with an integrated path-based and distributional method," arXiv, Mar. 2016, 10 pages.

Su et al., "Global relation embedding for relation extinction," arXiv, Apr. 2017, 11 pages.

Weeds et al., "A general framework for distributional similarity," Proceedings of the 2003 conference on Empirical methods in natural language processing, Jul. 2003, 8 pages.

PCT International Search Report and Written Opinion in International Application No. PCT/US2020/040890, dated Sep. 16, 2020, 15 pages.

* cited by examiner

IDENTIFYING ENTITY ATTRIBUTE RELATIONS

BACKGROUND

This specification relates to identifying entity-attribute relationships in text corpora.

Search-based applications (e.g., search engines, knowledge bases) aim to identify resources, e.g., web pages, images, text documents, and multimedia content, that are relevant to a user's information needs and to present information about the resources in a manner that is most useful to the user. One way in which search-based applications can present information about identified resources is in the form of structured search results. Structured search results generally present a list of attributes with answers for an entity specified in a user request (e.g., query). For example, in response to a query for "Kevin Durant," the structured search results may include attributes for "Kevin Durant," such as salary, team, birth year, family, etc., along with answers that provide information about these attributes.

Constructing such structured search results generally requires identifying entity-attribute relations. An entity-attribute relation is a special case of a text relation between a pair of terms. The first term in the pair of terms is an entity, which can be a person, place, organization, concept, etc. The second term in the pair of terms is an attribute, which is a string that describes some aspect or characteristics of the entity. Examples of attributes can include the "date of birth" of a person, the "population" of a country, the "salary" of the athlete, or the "CEO" of an organization.

SUMMARY

In general, one innovative aspect of the subject matter described in this specification can be embodied in methods that include the operations of obtaining an entity-attribute candidate pair that defines an entity and an attribute, wherein the attribute is a candidate attribute of the entity; determining, based on a set of sentences that include the entity and the attribute, whether the attribute is an actual attribute of the entity in the entity-attribute candidate pair, the determining comprising: generating embeddings for words in the set of sentences that include the entity and the attribute; generating, using known entity-attribute pairs, an attribute distributional embedding for the entity, wherein the attribute distributional embedding for the entity specifies an embedding for the entity based on other attributes associated with the entity from the known entity-attribute pairs; generating, using the known entity-attribute pairs an attribute distributional embedding for the attribute, wherein the attribute distributional embedding for the attribute specifies an embedding for the attribute that is based on known attributes associated with known entities of the attribute in the known entity-attribute pairs; determining, based on the embeddings for words in the set of sentences, the attribute distributional embedding for the entity, and the attribute distributional embedding for the attribute, whether the attribute in the entity-attribute candidate pair is an actual attribute of the entity in the entity-attribute candidate pair. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, generating embeddings for words in the set of sentences that include the entity and the attribute, comprises generating a first vector representation specifying a first embedding of words between the entity and the attribute in the set of sentences; generating a second vector representation specifying a second embedding for the entity based on the set of sentences; and generating a third vector representation specifying a third embedding for the attribute based on the set of sentences.

In some implementations, generating, using known entity-attribute pairs, an attribute distributional embedding for the entity, comprises generating a fourth vector representation, using known entity-attribute pairs, specifying the attribute distributional embedding for the entity.

In some implementations, generating, using the known entity-attribute pairs, an attribute distributional embedding for the attribute, comprises generating a fifth vector representation, using known entity-attribute pairs, specifying the attribute distributional embedding for the attribute.

In some implementations, determining, based on the embeddings for words in the set of sentences, the attribute distributional embedding for the entity, and the attribute distributional embedding for the attribute, whether the attribute in the entity-attribute candidate pair is an actual attribute of the entity in the entity-attribute candidate pair, comprises: determining, based on the first vector representation, the second vector representation, the third vector representation, the fourth vector representation, and the fifth vector representation, whether the attribute in the entity-attribute candidate pair is an actual attribute of the entity in the entity-attribute candidate pair.

In some implementations, determining, based on the first vector representation, the second vector representation, the third vector representation, the fourth vector representation, and the fifth vector representation, whether the attribute in the entity-attribute candidate pair is an actual attribute of the entity in the entity-attribute candidate pair, is performed using a feedforward network.

In some implementations, determining, based on the first vector representation, the second vector representation, the third vector representation, the fourth vector representation, and the fifth vector representation, whether the attribute in the entity-attribute candidate pair is an actual attribute of the entity in the entity-attribute candidate pair, comprises: generating a single vector representation by concatenating the first vector representation, the second vector representation, the third vector representation, the fourth vector representation, and the fifth vector representation; inputting the single vector representation into the feedforward network; and determining, by the feedforward network and using the single vector representation, whether the attribute in the entity-attribute candidate pair is an actual attribute of the entity in the entity-attribute candidate pair.

In some implementations, generating a fourth vector representation, using known entity-attribute pairs, specifying the attribute distributional embedding for the entity, comprises: identifying a set of attributes associated with the entity in the known entity-attribute pairs, wherein the set of attributes does not include the attribute; and generating an attribute distributional embedding for the entity by computing a weighted sum of attributes in the set of attributes.

In some implementations, generating a fifth vector representation, using known entity-attribute pairs, specifying the attribute distributional embedding for the attribute, comprises identifying, using the attribute, a set of entities from among the known entity-attribute pairs; for each entity in the set of entities, identifying a set of attributes associated with the entity, wherein the set of attributes does not include the attribute; and generating an attribute distributional embedding for the entity by computing a weighted sum of attributes in the set of attributes.

Particular embodiments of the subject matter described in this specification can be implemented to realize the advantage of identifying more accurate entity-attribute relations as compared to prior art model-based entity-attribute identification techniques. Prior art entity-attribute identification techniques use various model-based approaches (e.g., natural language processing (NLP) features, distant supervision, and traditional machine learning models) that identify entity-attribute relations by representing entities and attributes based on data (e.g., sentences) within which these terms appear. In contrast, the innovations described in this specification identify entity-attribute relations in datasets by not only using information about how entities and attributes are described in the data within which these terms appear, but also by representing entities and attributes using other attributes that are known to be associated with these terms. This enables representing entities and attributes with attributes shared by similar entities, which improves the accuracy of identifying entity-attribute relations that otherwise cannot be discerned simply by considering the sentences within which these terms appear.

For example, consider a scenario in which the dataset includes sentences that have two entities, "Ronaldo" and "Messi," being described using a "record" attribute, and a sentence where the entity "Messi" is described using a "goals" attribute. In such a scenario, the prior art techniques may identify the following entity attribute pairs: (Ronaldo, record), (Messi, record), and (Messi, goals). The innovations described in this specification go beyond these prior art approaches by identifying entity-attribute relations that might not be readily discerned by how these terms are used in the dataset. Using the above example, the innovation described in this specification determines that "Ronaldo" and "Messi" are similar entities because they share the "record" attribute, and then represents the "record" attribute using the "goals" attribute. In this way, the innovations described in this specification, for example, can enable identifying entity-attribute relations, e.g., (Cristiano, Goals), even though such a relation may not be readily discernible from the dataset.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to identifying entity-attribute relationships in text corpora.

As described further in this specification, a candidate entity-attribute pair (where the attribute is a candidate attribute of entity) is input to a classification model. The classification model, which includes a path embedding engine, a distributional representation engine, an attribute distributional engine, and a feedforward network, determines whether the attribute in the candidate entity-attribute pair is an actual attribute of the entity in the candidate entity-attribute pair.

The path embedding engine generates a vector that represents an embedding of the paths or the words that connect the joint occurrences of the entity and the attribute in a set of sentences (e.g., 30 or more sentences) of a dataset. The distributional representation engine generates vectors representing an embedding for the entity and attribute terms based on the context within which these terms appear in the set of sentences. The attribute distributional engine generates a vector representing an embedding for the entity and another vector representing an embedding for the attribute. The attribute distributional engine's embedding for the entity is based on other attributes (i.e., attributes other than the candidate attribute) known to be associated with the entity in the dataset. The attribute distributional engine's embedding for the attribute is based on other attributes associated with known entities of the candidate attribute.

The classification model concatenates the vector representations from the path embedding engine, the distributional representation engine, and the attribute distributional engine into a single vector representation. The classification model then inputs the single vector representation into a feedforward network that determines, using the single vector representation, whether the attribute in the candidate entity-attribute pair is an actual attribute of the entity in the candidate entity-attribute pair. If the feedforward network determines that the attribute in the candidate entity-attribute pair is an actual attribute of the entity in the candidate entity-attribute pair, the candidate entity-attribute pair is stored in the knowledge base along with other known/actual entity-attribute pairs.

These features and additional features are described in more detail below with reference to FIGS. 1-3.

Figure 1:
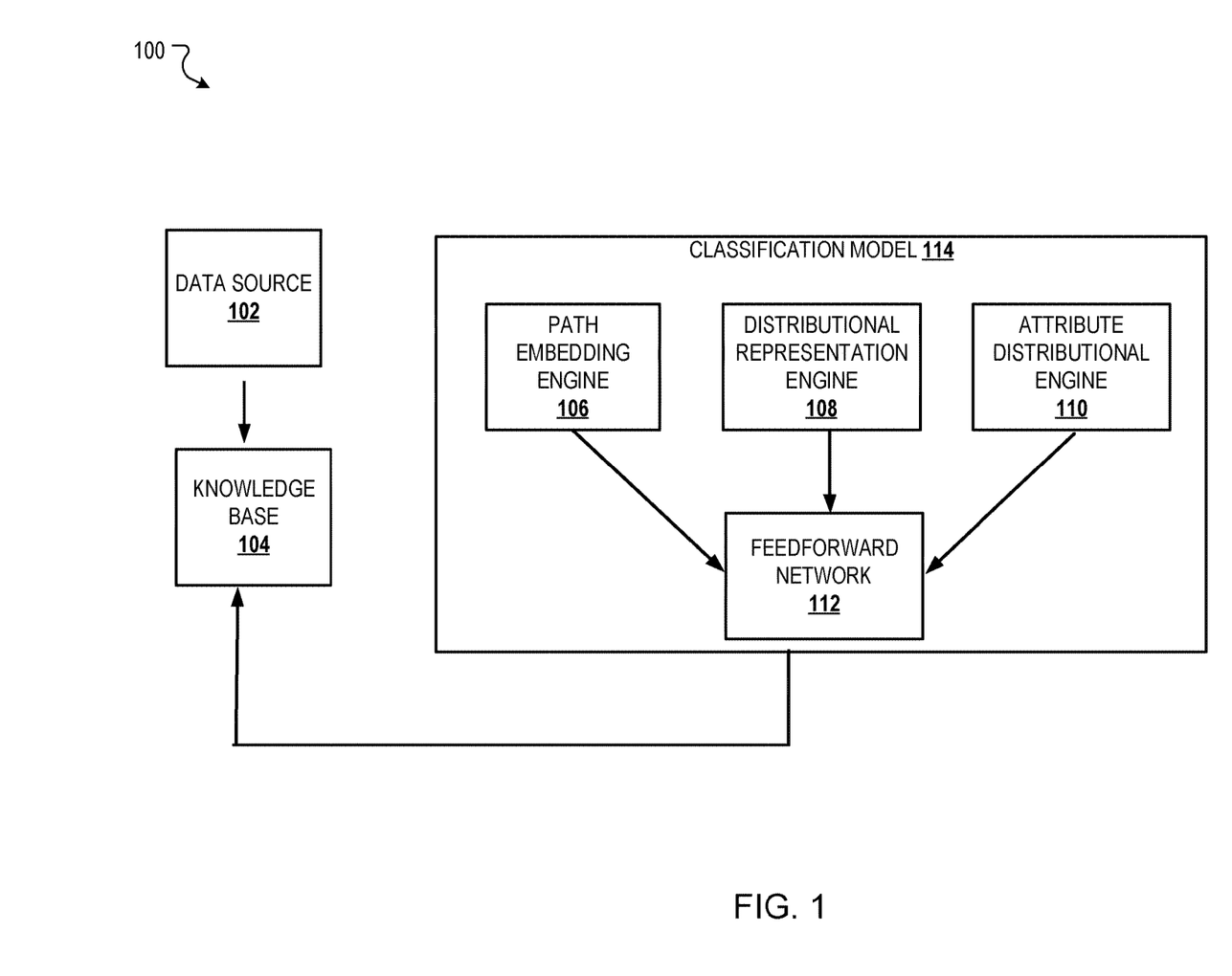
FIG. 1 is a block diagram of an example environment for extracting entity attribute relations.

FIG. 1 is a block diagram of an example environment for extracting entity attribute relations. The environment 100 includes a classification model 114 that, for candidate entity-attribute pairs in a knowledge base 104, determines whether an attribute in a candidate entity-attribute pair is an actual attribute of the entity in the candidate pair. In some implementations, the classification model 114 is a neural network model, the components/engines of which (and their respective operations) are described below. It will be appreciated that the classification model 114 can also be implemented using other types of supervised and/or unsupervised machine learning models.

The knowledge base 104, which can include one or more databases (or other appropriate data storage structures) stored in one or more non-transitory data storage media (e.g., hard drive(s), flash memory, etc.), stores a set of candidate entity-attribute pairs. The candidate entity-attribute pairs can be obtained using a set of content in the form of text documents (e.g., webpages, news articles, etc.) obtained from a data source 102, which can include any source of content, such as a news web site, a data aggregator platform, a social media platform, etc. In some implementations, the data source 102 obtains news articles from a data aggregator platform. In some implementations, the data source 102 can use a model (e.g., a supervised or unsupervised machine learning model, a natural language processing model) to generate a set of candidate entity-attribute pairs by extracting sentences from the articles, and tokenizing and labeling the extracted sentences, e.g., as entities and attributes, using part-of-speech and dependency parse tree tags. In some implementations, the data source 102 can input the extracted sentences into a machine learning model, which for example, can be trained using a set of training sentences and their associated entity-attribute pairs. Such a machine learning model can then output the candidate entity-attribute pairs for the input extracted sentences.

The data source 102 stores, in the knowledge base 104, the candidate entity-attribute pairs along with the sentences extracted by the data source 102 that include the words of the candidate entity-attribute pairs. In some implementations, the candidate entity-attribute pairs are only stored in the knowledge base 104 if the number of sentences in which the entity and attribute are present satisfies (e.g., meets or exceeds) a threshold number of sentences (e.g., 30 sentences).

A classification model 114 determines whether the attribute in a candidate entity-attribute pair (stored in the knowledge base 104) is an actual attribute of the entity in the candidate entity-attribute pair. The classification model 114 includes a path embedding engine 106, a distributional representation engine 108, an attribute distributional engine 110, and a feedforward network 112. As used herein, the term engine refers to a data processing apparatus that performs a set of tasks. The operations of each of these engines of the classification model 114 in determining whether the attribute in a candidate entity-attribute pair is an actual attribute of the entity, is described with reference to FIG. 2.

Figure 2:
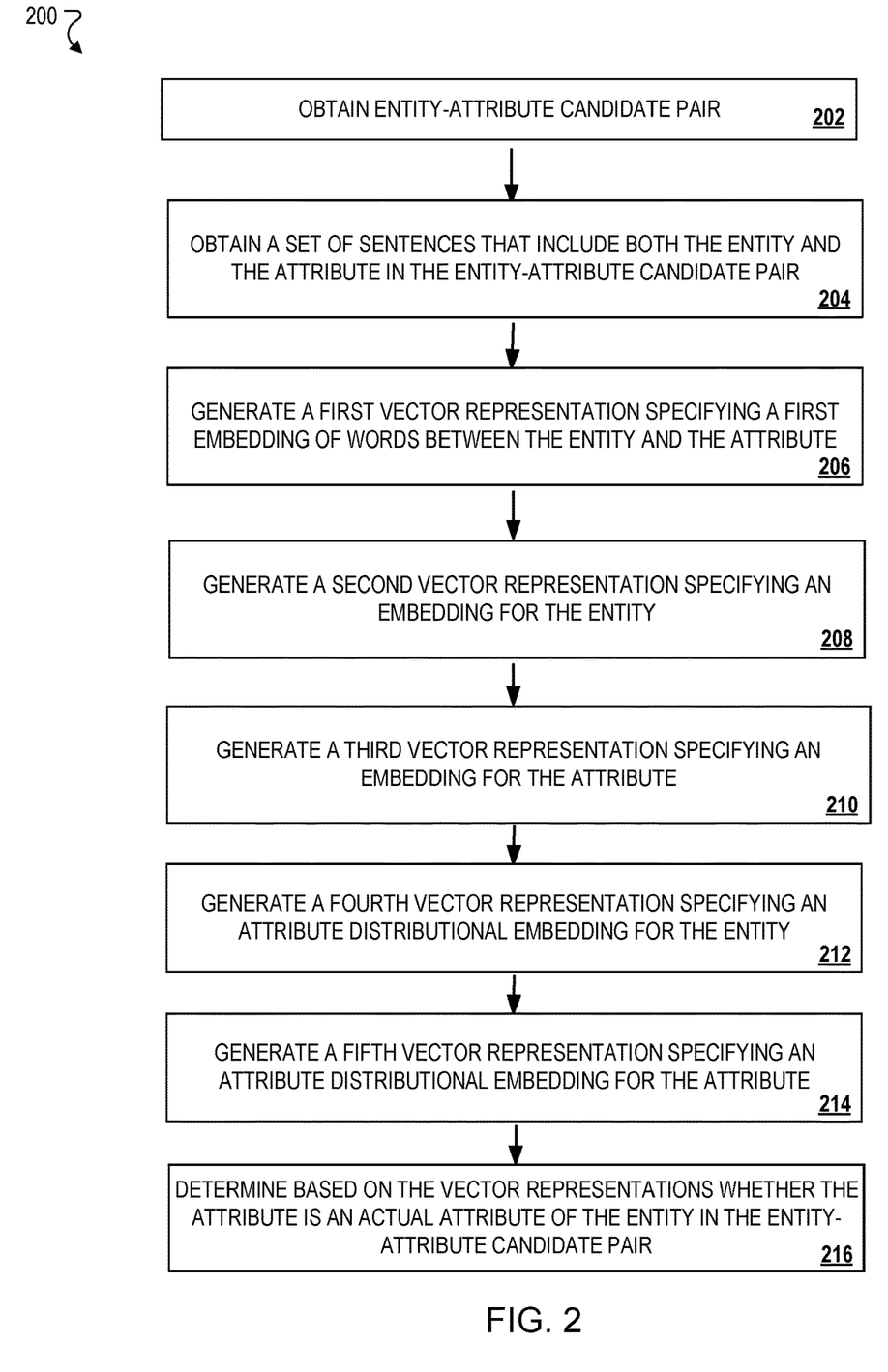
FIG. 2 is a flow diagram of an example process for identifying entity attribute relations.

FIG. 2 is a flow diagram of an example process 200 for identifying entity attribute relations. Operations of process 200 are described below as being performed by the components of the system described and depicted in FIG. 1. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions cause one or more data processing apparatus to perform operations of the process 200.

The knowledge base 104 obtains an entity-attribute candidate pair from the data source 104, as described with reference to FIG. 1 (at 202).

The knowledge base 104 obtains a set of sentences from the data source 102 that include the words of the entity and the attribute in the candidate entity-attribute pair, as described above with reference to FIG. 1 (at 204).

The classification model 114 determines, based on the set of sentences and the candidate entity-attribute pair, whether the candidate attribute is an actual attribute of the candidate entity. In some implementations, the set of sentences can be a large number of sentences, e.g., 30 or more sentences. The classification model makes this determination by performing the following operations: (1) generating embeddings for words in the set of sentences that include the entity and the attribute, which are described in greater detail below with reference to operations 206, 208, and 210 below; (2) generating, using known entity-attribute pairs, an attribute distributional embedding for the entity, which is described in greater detail below with reference to operation 212; (3) generating, using the known entity-attribute pairs an attribute distributional embedding for the attribute, which is described in greater detail below with reference to operation 214; and (4) determining, based on the embeddings for words in the set of sentences, the attribute distributional embedding for the entity, and the attribute distributional embedding for the attribute, whether the attribute in the entity-attribute candidate pair is an actual attribute of the entity in the entity-attribute candidate pair, which is described in greater detail below with reference to operation 216. Operations 206 to 216 are described below.

The path embedding engine 106 generates a first vector representation specifying a first embedding of words between the entity and the attribute in the set of sentences (at 206). The path embedding engine 106 detects relationships between candidate entity-attribute terms by embedding the paths or the words that connect the joint occurrences of these terms in the set of sentences. For example, for a phrase "snake is a reptile," the path embedding engine 106 generates an embedding for the path "is a," which can then be used to detect, e.g., genus-species relationships, that can then be used to identify other entity-attribute pairs.

The path embedding engine 106 performs the following operations to generate an embedding of the words between the entity and the attribute in the set of sentences. For each sentence in the set of sentences, the path embedding engine 106 first extracts the dependency path (which specifies a set of words) between the entity and the attribute. The path embedding engine 106 converts the sentence from a string to a list, where the first term is the entity and the last term is the attribute (or alternatively, the first term is the attribute and the last term is the entity). Each term (which is also referred to as an edge) in the dependency path is represented using the following features: the lemma of the term, a part-of-speech tag, the dependency label, and the direction of the dependency path (left, right or root). Each of these features is embedded and concatenated to produce a vector representation for the term or edge ($V_e$), which comprises a sequence of vectors ($V_l$, $V_{pos}$, $V_{dep}$, $V_{dir}$), as shown by the below equation:

$$\vec{v}_e = [\vec{v}_l, \vec{v}_{pos}, \vec{v}_{dep}, \vec{v}_{dir}]$$

The path embedding engine 106 then inputs the sequence of vectors for the terms or edges in each path into an long short-term memory (LSTM) network, which produces a single vector representation for the sentence ($V_s$), as shown by the below equation:

$$\vec{v}_s = \text{LSTM}(\vec{v}_e^{(1)}, \ldots, \vec{v}_e^{(k)})$$

Finally, the path embedding engine 106 inputs the single vector representation for all sentences in the set of sentences into an attention mechanism, which determines a weighted mean of the sentence representations ($V_{sents(e,a)}$), as shown by the below equation:

$$\vec{v}_{sents(e,a)} = \text{ATTN}(\vec{v}_s^{(1)}, \ldots, \vec{v}_s^{(n)})$$

The distributional representational model 108 generates a second vector representation for the entity and a third vector representation for the attribute based on the set of sentences (at 208 and 210). The distributional representation engine 108 detects relationships between candidate entity-attribute terms based on the context within which attribute and the entity of the candidate entity-attribute pair occur in the set of sentences. For example, the distributional representation engine 108 may determine that the entity "New York" is used in the set of sentences in a way that suggests that this entity refers to a city or state in the United States. As another example, the distributional representation engine 108 may determine that the attribute "capital" is used in the set of sentences in a way that suggests that this attribute refers to an important city within a state or country. Thus, the distributional representation engine 108 generates a vector representation specifying an embedding for the entity ($V_e$) using the context (i.e., the set of sentences) within which the entity appears. Similarly, the distributional representation engine 108 generates a vector representation ($V_a$) specifying an embedding for the attribute using the set of sentences in which the attribute appears.

The attribute distributional engine 110 generates a fourth vector representation specifying an attribute distributional embedding for the entity using known entity-attribute pairs (at 212). The known entity-attribute pairs, which are stored in the knowledge base 104, are entity-attribute pairs for which it has been confirmed (e.g., using prior processing by the classification model 114 or based on a human evaluation) that each attribute in the entity-attribute pair is an actual attribute of the entity in the entity-attribute pair.

In some implementations, the attribute distributional engine 110 performs the following operations to determine an attribute distributional embedding that specifies an embedding for the entity using some (e.g., the most common) or all of the other known attributes among the known entity-attribute pairs with which that entity is associated. For the entity in the entity-attribute candidate pair, the attribute distributional engine 110 identifies the other attributes (i.e., attributes other than the one included in the entity-attribute candidate pair) associated with the entity in the known entity-attribute pairs. For example, for an entity "Michael Jordan" in the candidate entity-attribute pair (Michael Jordan, famous), the attribute distributional engine 110 can use the known entity-attribute pairs for Michael Jordan, such as (Michael Jordan, wealthy) and (Michael Jordan, record), to identify attributes such as wealthy and record.

The attribute distributional engine 110 then generates an embedding for the entity by computing a weighted sum of the identified known attributes (as described in the preceding paragraph), where the weights are learned using through an attention mechanism, as shown in the below equation:

$$\vec{v}_e = \text{ATTN}(\varepsilon(\alpha_1) \ldots \varepsilon(\alpha_m))$$

The attribute distributional engine 110 generates a fifth vector representation specifying an attribute distributional embedding for the attribute using the known entity-attribute pairs (at 214). In some implementations, the attribute distributional engine 110 performs the following operations to determine a representation for the attribute based on some (e.g., the most common) or all of the known attributes associated with known entities of the candidate attribute. For the attribute in the entity-attribute candidate pair, the attribute distributional engine 110 identifies the known entities among the known entity-attribute pairs that have the attribute. For each identified known entity, the attribute distributional engine 110 identifies other attributes (i.e., attributes other than the one included in the entity-attribute candidate pair) associated with the entity in the known entity-attribute pairs. In some implementations, the attribute distributional engine 110 can identify a subset of attributes from among the identified attributes by: (1) ranking the attributes based on the number of known entities associated with each entity (e.g., assigning a higher rank to attributes associated with a higher number of entities than those associated with fewer entities); and (2) then selecting a threshold number of attributes based on the ranking (e.g., selecting the top five highest ranked attributes).

The attribute distributional engine 110 then generates an embedding for the attribute by computing a weighted sum of (all or a subset of) the identified known attributes (as described in the preceding paragraph), where the weights are learned using through an attention mechanism, as shown in the below equation:

$$\vec{v}_a = \text{ATTN}(\varepsilon(\alpha_1) \ldots \varepsilon(\alpha_m))$$

It will be appreciated that the embeddings generated by operations 206 to 214 are generally generated by the respective engines (106, 108, 110) in parallel.

The feedforward network 112 determines based on the vector representations whether the attribute in the entity-attribute candidate pair is an actual attribute of the entity in the entity-attribute candidate pair (at 216). In some implementations, the feedforward network 112 concatenates each of the vector representations output by the path embedding engine 106, the distributional representation engine 108, and the attribute distributional engine 110 into a single vector representation ($V_{(e,a)}$), as shown by the below equation:

$$\vec{v}_{(e,a)} = [\vec{v}_e, \vec{v}_e, \vec{v}_{sents(e,a)}, \vec{v}_a, \vec{v}_a]$$

Using this input single vector representation, the feedforward network 112 outputs whether the attribute in the candidate entity-attribute pair is an actual attribute of the entity in the candidate entity-attribute pair. In some implementations, the output of the feedforward network 112 can be binary. For example, the feedforward network 112 can output "yes" when the attribute in the candidate entity-attribute pair is an actual attribute of the entity in the candidate entity-attribute pair and "no" when the attribute in the candidate entity-attribute pair is not an actual attribute of the entity in the candidate entity-attribute pair. In some implementations, the output of the feedforward network 112 can be a confidence value, e.g., a value ranging from 0 to 1, where 0 specifies that the attribute in the candidate entity-attribute pair is not an actual attribute of the entity in the candidate entity-attribute pair and 1 specifies that the attribute in the candidate entity-attribute pair is an actual attribute of the entity in the candidate entity-attribute pair.

In some implementations, the feedforward network 112 is trained using distant supervision. The training uses the classification model 114 to perform the above-described processing for candidate entity-attribute pairs that have been identified as true pairs (i.e., for which the attribute in the candidate entity-attribute pair has been identified—e.g., based on human evaluation or prior processing by the feedforward network 112—as an actual attribute of the entity in the candidate entity-attribute pair).

If the output of the feedforward network 112 specifies that the attribute in the entity-attribute candidate pair is an actual attribute (e.g., if the feedforward network 112 outputs a "yes" indicator as described above) or has a high likelihood of being (e.g., if the feedforward network 112 outputs a confidence value, as described above, that meets or exceeds a certain threshold value, such as 0.8), the feedforward network 112 stores the entity-attribute candidate pair as an actual entity-attribute pair in the knowledge base 104.

Figure 3:
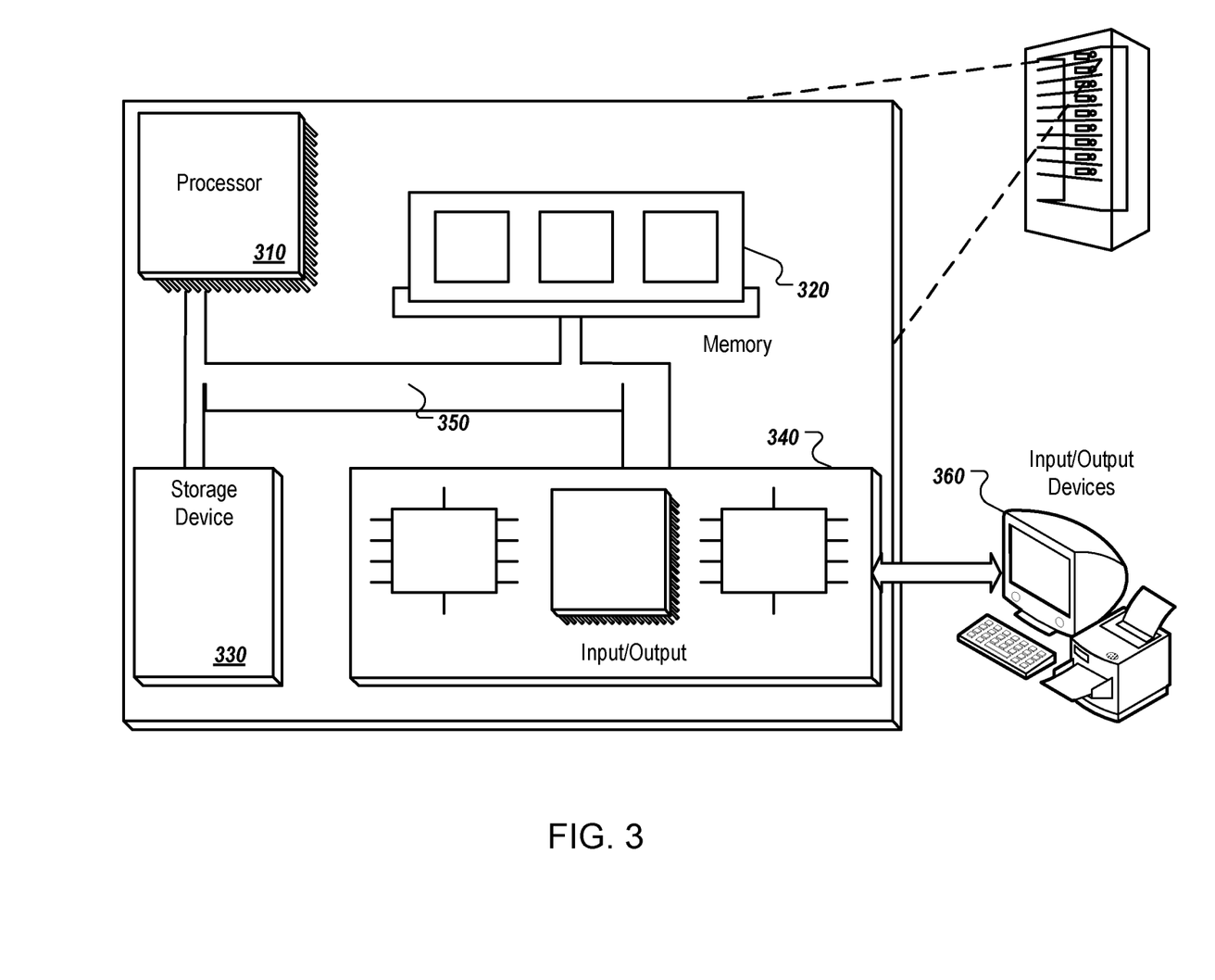
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In some implementations, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In some implementations, the memory 320 is a volatile memory unit. In another implementation, the memory 320 is a non-volatile memory unit.

The storage device 330 is capable of providing mass storage for the system 300. In some implementations, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In some implementations, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining an entity-attribute candidate pair that defines an entity and an attribute, wherein the attribute is a candidate attribute of the entity; and
    determining, based on a set of sentences that include the entity and the attribute, whether the attribute is an actual attribute of the entity in the entity-attribute candidate pair, the determining comprising:
        generating embeddings for words in the set of sentences that include the entity and the attribute,
        generating, using known entity-attribute pairs, an attribute distributional embedding for the entity, wherein the attribute distributional embedding for the entity specifies an embedding for the entity based on other attributes associated with the entity from the known entity-attribute pairs,
        generating, using the known entity-attribute pairs, an attribute distributional embedding for the attribute, wherein the attribute distributional embedding for the attribute specifies an embedding for the attribute that is based on known attributes associated with known entities of the attribute in the known entity-attribute pairs, and
        determining, based on the embeddings for the words in the set of sentences, the attribute distributional embedding for the entity, and the attribute distributional embedding for the attribute, whether the attribute in the entity-attribute candidate pair is an actual attribute of the entity in the entity-attribute candidate pair.

2. The computer-implemented method of claim 1, wherein generating the embeddings for the words in the set of sentences that include the entity and the attribute comprises:
    generating a first vector representation specifying a first embedding of words between the entity and the attribute in the set of sentences;
    generating a second vector representation specifying a second embedding for the entity based on the set of sentences; and
    generating a third vector representation specifying a third embedding for the attribute based on the set of sentences.

3. The computer-implemented method of claim 2, wherein:
    generating the attribute distributional embedding for the entity comprises generating a fourth vector representation, using the known entity-attribute pairs, specifying the attribute distributional embedding for the entity; and generating the attribute distributional embedding for the attribute, comprises generating a fifth vector representation, using the known entity-attribute pairs, specifying the attribute distributional embedding for the attribute.

4. The computer-implemented method of claim 3, wherein determining whether the attribute in the entity-attribute candidate pair is an actual attribute of the entity in the entity-attribute candidate pair comprises:

determining, based on the first vector representation, the second vector representation, the third vector representation, the fourth vector representation, and the fifth vector representation, whether the attribute in the entity-attribute candidate pair is an actual attribute of the entity in the entity-attribute candidate pair.

5. The computer-implemented method of claim 4, wherein determining whether the attribute in the entity-attribute candidate pair is an actual attribute of the entity in the entity-attribute candidate pair is performed using a feedforward network.

6. The computer-implemented method of claim 5, whether determining whether the attribute in the entity-attribute candidate pair is an actual attribute of the entity in the entity-attribute candidate pair comprises:

combining the first vector representation, the second vector representation, the third vector representation, the fourth vector representation, and the fifth vector representation into a single vector representation;

inputting the single vector representation into the feedforward network; and determining, by the feedforward network and using the single vector representation, whether the attribute in the entity-attribute candidate pair is an actual attribute of the entity in the entity-attribute candidate pair.

7. The computer-implemented method of claim 3, wherein generating the fourth vector representation comprises:

identifying a set of attributes associated with the entity in the known entity-attribute pairs, wherein the set of attributes does not include the attribute; and generating the attribute distributional embedding for the entity by computing a weighted sum of attributes in the set of attributes.

8. The computer-implemented method of claim 3, wherein generating the fifth vector representation comprises:

identifying, using the attribute, a set of entities from among the known entity-attribute pairs;

for each entity in the set of entities, identifying a set of attributes associated with the entity, wherein the set of attributes does not include the attribute; and generating the attribute distributional embedding for the entity by computing a weighted sum of attributes in the set of attributes.

9. A system, comprising:
one or more memory devices storing instructions; and
one or more data processing apparatus that are configured to interact with the one or more memory devices, and upon execution of the instructions, perform operations including:

obtaining an entity-attribute candidate pair that defines an entity and an attribute, wherein the attribute is a candidate attribute of the entity; and determining, based on a set of sentences that include the entity and the attribute, whether the attribute is an actual attribute of the entity in the entity-attribute candidate pair, the determining comprising:

generating embeddings for words in the set of sentences that include the entity and the attribute, generating, using known entity-attribute pairs, an attribute distributional embedding for the entity, wherein the attribute distributional embedding for the entity specifies an embedding for the entity based on other attributes associated with the entity from the known entity-attribute pairs, generating, using the known entity-attribute pairs, an attribute distributional embedding for the attribute, wherein the attribute distributional embedding for the attribute specifies an embedding for the attribute that is based on known attributes associated with known entities of the attribute in the known entity-attribute pairs, and determining, based on the embeddings for the words in the set of sentences, the attribute distributional embedding for the entity, and the attribute distributional embedding for the attribute, whether the attribute in the entity-attribute candidate pair is an actual attribute of the entity in the entity-attribute candidate pair.

10. The system of claim 9, wherein generating the embeddings for the words in the set of sentences that include the entity and the attribute comprises:

generating a first vector representation specifying a first embedding of words between the entity and the attribute in the set of sentences;

generating a second vector representation specifying a second embedding for the entity based on the set of sentences; and generating a third vector representation specifying a third embedding for the attribute based on the set of sentences.

11. The system of claim 10, wherein:
generating the attribute distributional embedding for the entity comprises generating a fourth vector representation, using the known entity-attribute pairs, specifying the attribute distributional embedding for the entity; and generating the attribute distributional embedding for the attribute, comprises generating a fifth vector representation, using the known entity-attribute pairs, specifying the attribute distributional embedding for the attribute.

12. The system of claim 11, wherein determining whether the attribute in the entity-attribute candidate pair is an actual attribute of the entity in the entity-attribute candidate pair comprises:

determining, based on the first vector representation, the second vector representation, the third vector representation, the fourth vector representation, and the fifth vector representation, whether the attribute in the entity-attribute candidate pair is an actual attribute of the entity in the entity-attribute candidate pair.

13. The system of claim 12, wherein determining whether the attribute in the entity-attribute candidate pair is an actual attribute of the entity in the entity-attribute candidate pair is performed using a feedforward network.

14. The system of claim 13, wherein determining whether the attribute in the entity-attribute candidate pair is an actual attribute of the entity in the entity-attribute candidate pair, comprises:

combining the first vector representation, the second vector representation, the third vector representation, the fourth vector representation, and the fifth vector representation into a single vector representation;

inputting the single vector representation into the feedforward network; and determining, by the feedforward network and using the single vector representation, whether the attribute in the entity-attribute candidate pair is an actual attribute of the entity in the entity-attribute candidate pair.

15. The system of claim 11, wherein generating the fourth vector representation comprises:

identifying a set of attributes associated with the entity in the known entity-attribute pairs, wherein the set of attributes does not include the attribute; and generating the attribute distributional embedding for the entity by computing a weighted sum of attributes in the set of attributes.

16. The system of claim 11, wherein generating the fifth vector representation comprises:

identifying, using the attribute, a set of entities from among the known entity-attribute pairs;

for each entity in the set of entities, identifying a set of attributes associated with the entity, wherein the set of attributes does not include the attribute; and generating the attribute distributional embedding for the entity by computing a weighted sum of attributes in the set of attributes.

17. A non-transitory computer readable medium storing instructions that, when executed by one or more data processing apparatus, cause the one or more data processing apparatus to perform operations comprising:

obtaining an entity-attribute candidate pair that defines an entity and an attribute, wherein the attribute is a candidate attribute of the entity; and determining, based on a set of sentences that include the entity and the attribute, whether the attribute is an actual attribute of the entity in the entity-attribute candidate pair, the determining comprising:

generating embeddings for words in the set of sentences that include the entity and the attribute, generating, using known entity-attribute pairs, an attribute distributional embedding for the entity, wherein the attribute distributional embedding for the entity specifies an embedding for the entity based on other attributes associated with the entity from the known entity-attribute pairs, generating, using the known entity-attribute pairs, an attribute distributional embedding for the attribute, wherein the attribute distributional embedding for the attribute specifies an embedding for the attribute that is based on known attributes associated with known entities of the attribute in the known entity-attribute pairs, and determining, based on the embeddings for the words in the set of sentences, the attribute distributional embedding for the entity, and the attribute distributional embedding for the attribute, whether the attribute in the entity-attribute candidate pair is an actual attribute of the entity in the entity-attribute candidate pair.

18. The non-transitory computer readable medium of claim 17, wherein generating the embeddings for the words in the set of sentences that include the entity and the attribute comprises:

generating a first vector representation specifying a first embedding of words between the entity and the attribute in the set of sentences;

generating a second vector representation specifying a second embedding for the entity based on the set of sentences; and generating a third vector representation specifying a third embedding for the attribute based on the set of sentences.

19. The non-transitory computer readable medium of claim 18, wherein:

generating the attribute distributional embedding for the entity comprises generating a fourth vector representation, using the known entity-attribute pairs, specifying the attribute distributional embedding for the entity; and generating the attribute distributional embedding for the attribute comprises generating a fifth vector representation, using the known entity-attribute pairs, specifying the attribute distributional embedding for the attribute.

20. The non-transitory computer readable medium of claim 19, wherein determining whether the attribute in the entity-attribute candidate pair is an actual attribute of the entity in the entity-attribute candidate pair comprises:

determining vector representation, the second vector representation, the third vector representation, the fourth vector representation, and the fifth vector representation, whether the attribute in the entity-attribute candidate pair is an actual attribute of the entity in the entity-attribute candidate pair.

21. The non-transitory computer readable medium of claim 20, wherein determining whether the attribute in the entity-attribute candidate pair is an actual attribute of the entity in the entity-attribute candidate pair is performed using a feedforward network.

22. The non-transitory computer readable medium of claim 21, wherein determining whether the attribute in the entity-attribute candidate pair is an actual attribute of the entity in the entity-attribute candidate pair comprises:

combining the first vector representation, the second vector representation, the third vector representation, the fourth vector representation, and the fifth vector representation into a single vector representation;

inputting the single vector representation into the feedforward network; and determining, by the feedforward network and using the single vector representation, whether the attribute in the entity-attribute candidate pair is an actual attribute of the entity in the entity-attribute candidate pair.

23. The non-transitory computer readable medium of claim 19, wherein generating the fourth vector representation comprises:

identifying a set of attributes associated with the entity in the known entity-attribute pairs, wherein the set of attributes does not include the attribute; and generating the attribute distributional embedding for the entity by computing a weighted sum of attributes in the set of attributes.

24. The non-transitory computer readable medium of claim 19, wherein generating the fifth vector representation comprises:

identifying, using the attribute, a set of entities from among the known entity-attribute pairs;

for each entity in the set of entities, identifying a set of attributes associated with the entity, wherein the set of attributes does not include the attribute; and generating the attribute distributional embedding for the entity by computing a weighted sum of attributes in the set of attributes.

* * * * *

UNITED STATES PATENT AND TRADEMARK OFFICE
CERTIFICATE OF CORRECTION

PATENT NO. : 11,263,400 B2
APPLICATION NO. : 16/504068
DATED : March 1, 2022
INVENTOR(S) : Iter et al.

It is certified that error appears in the above-identified patent and that said Letters Patent is hereby corrected as shown below:

On the Title Page

On Page 2, Column 2, Item (56), under "OTHER PUBLICATIONS", Line 21, delete "innatmal" and insert --in natural--, therefor.

On Page 2, Column 2, Item (56), under "OTHER PUBLICATIONS", Line 28, delete "extinction," and insert --extraction,--, therefor.

In the Claims

In Column 13, Claim 6, Line 26, delete "whether" and insert --wherein--, therefor.

In Column 16, Claim 20, Line 26, delete "determining vector" and insert --determining, based on the first vector--, therefor.

Signed and Sealed this
Thirty-first Day of May, 2022

Katherine Kelly Vidal
*Director of the United States Patent and Trademark Office*